United States Patent
Lin et al.

(10) Patent No.: US 10,732,327 B2
(45) Date of Patent: Aug. 4, 2020

(54) FRESNEL LENS

(71) Applicant: GENIUS ELECTRONIC OPTICAL CO., LTD., Taichung (TW)

(72) Inventors: Yi-Jyun Lin, Taichung (TW); En-Chieh Chen, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 0 days.

(21) Appl. No.: 15/942,403

(22) Filed: Mar. 30, 2018

(65) Prior Publication Data

US 2019/0250310 A1  Aug. 15, 2019

(30) Foreign Application Priority Data

Feb. 12, 2018 (CN) .......................... 2018 1 0144667

(51) Int. Cl.
   *G02B 3/08* (2006.01)

(52) U.S. Cl.
   CPC ...................... *G02B 3/08* (2013.01)

(58) Field of Classification Search
   CPC ........................................... G02B 3/08
   See application file for complete search history.

(56) References Cited

U.S. PATENT DOCUMENTS

| 4,824,227 A | 4/1989 | Goldenberg et al. |
| 2013/0050851 A1* | 2/2013 | Machida ............ G02B 3/08 |
| | | 359/742 |
| 2014/0226221 A1 | 8/2014 | Fermigier et al. |
| 2015/0226887 A1* | 8/2015 | Gombert ............ G02B 3/08 |
| | | 359/742 |
| 2015/0261008 A1* | 9/2015 | Fujii ................. G02B 3/08 |
| | | 351/159.01 |

FOREIGN PATENT DOCUMENTS

| CN | 104813200 | 7/2015 |
| TW | 200933198 | 8/2009 |
| WO | 2017125979 | 7/2017 |

OTHER PUBLICATIONS

"Office Action of Taiwan Counterpart Application," dated Jun. 13, 2018, pp. 1-4.

* cited by examiner

*Primary Examiner* — Wen Huang
(74) *Attorney, Agent, or Firm* — JCIPRNET

(57) ABSTRACT

A Fresnel lens includes a Fresnel surface that includes effective Fresnel surfaces allowing imaging rays to pass through. Two adjacent effective Fresnel surfaces are connected through a non-effective Fresnel surface. On a cross-section including an optical axis of the Fresnel lens, a draft angle is between a reference line and a connecting straight line between one end of each non-effective Fresnel surface located at a tooth peak of the Fresnel lens and the other end of each non-effective Fresnel surface located at a tooth valley of the Fresnel lens. The optical axis coincides with the cross-section. The reference line is parallel to the optical axis and passes through the end of the effective Fresnel surface located at the tooth peak of the Fresnel lens. The draft angles each smaller than 90 degrees include first, second, third, fourth, and fifth draft angles which gradually increase radially outward from the optical axis.

8 Claims, 4 Drawing Sheets

FRESNEL LENS

CROSS-REFERENCE TO RELATED APPLICATION

This application claims the priority benefit of Chinese application serial no. 201810144667.7, filed on Feb. 12, 2018. The entirety of the above-mentioned patent application is hereby incorporated by reference herein and made a part of this specification.

TECHNICAL FIELD

The disclosure relates to a lens; more particularly, the disclosure relates to a Fresnel lens.

DESCRIPTION OF RELATED ART

According to the related art, the optical imaging quality of normal Fresnel lenses are often deteriorated because of lens flares or light spots on images, which often results from stray light generated by reflections of refractions by light rays incident on non-effective Fresnel surfaces. Practically, when the Fresnel lenses are formed by injection molding, draft angles are often required for separating the Fresnel lenses and the molds. In the related art, however, each draft angle of a Fresnel lens stays the same; hence, the light rays incident on the non-effective Fresnel surfaces are reflected at the same angle to form the stray light. Such design causes the stray light to be focused and to have high illuminance, so that distinct lens flares or light sports may be formed on the imaging plane, which deteriorates the imaging quality and reduces clarify. Therefore, how to reduce the illuminance of the stray light, improve the overall clarity of the image, and thereby enhance the optical imaging quality of the Fresnel lenses is a topic to be researched by practitioners in the pertinent field.

SUMMARY

The disclosure provides a Fresnel lens having fine optical imaging quality.

In an embodiment, a Fresnel lens including a Fresnel surface is provided. The Fresnel surface includes a plurality of effective Fresnel surfaces allowing imaging rays to pass through. Two adjacent effective Fresnel surfaces are connected to each other through a non-effective Fresnel surface. On a cross-section including an optical axis of the Fresnel lens, a draft angle is included between a reference line and a connecting straight line between one end of each non-effective Fresnel surface located at a tooth peak of the Fresnel lens and the other end of the corresponding non-effective Fresnel surface located at a tooth valley of the Fresnel lens. The reference line is parallel to the optical axis and passes through an end of the effective Fresnel surface located at the tooth peak of the Fresnel lens. The optical axis coincides with the cross-section. Each draft angle is smaller than 90 degrees. The draft angles include a first draft angle counted as the first radially outward from the optical axis, a second draft angle counted as the second radially outward from the optical axis, a third draft angle counted as the third radially outward from the optical axis, a fourth draft angle counted as the fourth radially outward from the optical axis, and a fifth draft angle counted as the fifth radially outward from the optical axis. The second draft angle is larger than the first draft angle. The third draft angle is larger than the second draft angle. The fourth draft angle is larger than the third draft angle. The fifth draft angle is larger than the fourth draft angle.

In view of the above, in the Fresnel lens provided in one or more of the embodiments, the draft angles gradually increasing outward from the optical axis along the radial direction are arranged in the Fresnel lens, so as to effectively expand the irradiation area of stray light and reduce the illuminance of the stray light, thereby achieving satisfactory optical imaging quality.

To make the above features provided in one or more of the embodiments more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

The Fresnel lens provided in the following embodiments is applicable to optical imaging lenses or optical lenses for illumination in head-mounted display apparatus capable of simulating three-dimensional visual perception (e.g., virtual reality, VR) or in portable electronic apparatuses including mobile phones, cameras, tablet PCs, personal digital assistants (PDA), and so on.

To elaborate the arrangement of the Fresnel lens, the Fresnel lens provided in the following embodiments may be considered as being located within a three-dimensional space constructed by x-axis, y-axis, and z-axis, and every two of the x-axis, y-axis, and z-axis are perpendicular to each other.

FIG. 1 to FIG. 4 are schematic cross-sectional views of a Fresnel lens according to different embodiments of the invention.

Figure 1:
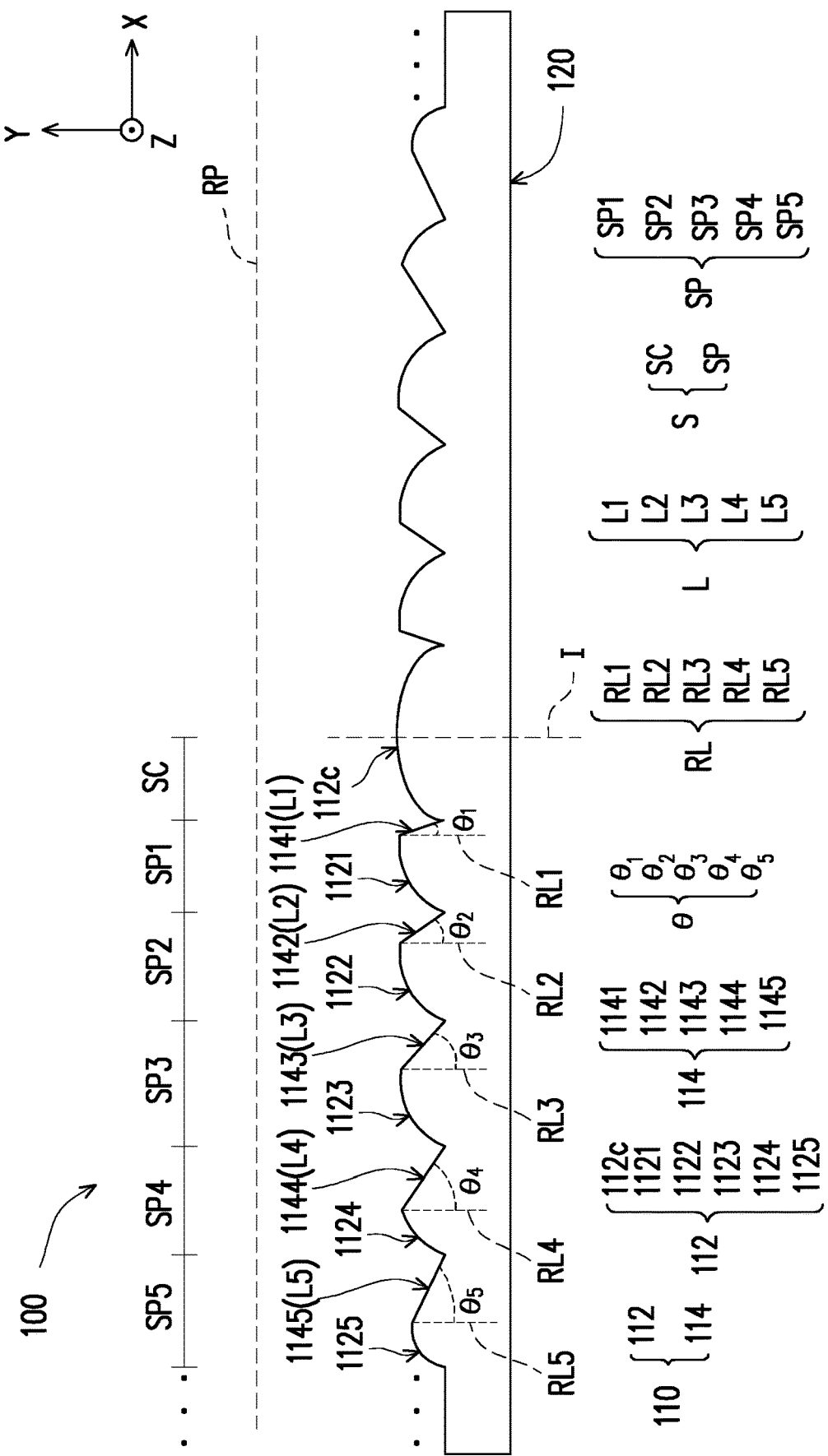
FIG. 1 to FIG. 4 are schematic cross-sectional views of a Fresnel lens according to different embodiments of the invention.

With reference to FIG. 1, in the present embodiment, the Fresnel lens 100 has a Fresnel surface 110 and a surface 120 opposite to the Fresnel surface 110. According to an embodiment, the surface 120 may be a plane, a concave surface, a convex surface, or a Fresnel surface; in the present embodiment, the surface 120 is a plane, for instance. The cross-section shown in FIG. 1 includes an optical axis I of the Fresnel lens 100; that is, the optical axis I coincides with the cross-section shown in FIG. 1, i.e., an x-y plane.

The Fresnel surface 110 includes a plurality of effective Fresnel surfaces 112 allowing imaging rays to pass through. Two adjacent effective Fresnel surfaces 112 are connected to each other through a non-effective Fresnel surface 114. The effective Fresnel surfaces 112 and the non-effective Fresnel surfaces 114 are alternately arranged. In an embodiment, the effective Fresnel surface 112 refers to a curved surface of a normal optical lens with corresponding optical functions. For instance, if the optical lens is a convergent lens (e.g., a convex lens), the curved surface with the corresponding optical functions has a convergence function; if the optical lens is a divergent lens (e.g., a concave lens), the curved surface with the corresponding optical functions has a divergence function. Hence, when light rays pass through the effective Fresnel surfaces 112, the light rays are refracted by the effective Fresnel surfaces 112 and are thus converged or diverged. By contrast, when light rays pass through the non-effective Fresnel surfaces 114, the light rays are refracted by the non-effective Fresnel surfaces 114 and are thus emitted from the Fresnel lens 100 and form stray light in an unexpected manner which departs from the original design consideration. In the present embodiment, the effective Fresnel surfaces 112 are shaped as convex surfaces with the convergence function. In other embodiments, the effective Fresnel surfaces 112 may also be shaped as concave surfaces with the divergence function, which should however not be construed as a limitation in the disclosure. Besides, in the present embodiment, the non-effective Fresnel surfaces 114 are conical surfaces.

In another aspect, the effective Fresnel surfaces 112 and the non-effective Fresnel surfaces 114 form a plurality of teeth S radially outward from the optical axis I. The teeth S include a central tooth SC and a plurality of peripheral teeth SP (in FIG. 1, one central tooth SC and five peripheral teeth SP are depicted, for instance). The central tooth SC and the peripheral teeth SP arranged radially outward from the optical axis I are in the sequence of the central tooth SC, the first peripheral tooth SP1, the second peripheral tooth SP2, the third peripheral tooth SP3, the fourth peripheral tooth SP4, and the fifth peripheral tooth SP5. The radial direction is, for instance, the direction of the positive x axis, the direction of the negative x axis, the direction of the negative z axis, or any other direction perpendicular to the y axis, wherein the optical axis I is parallel to the y axis. In the present embodiment, the central tooth SC includes a central effective Fresnel surface 112c, and the optical axis I passes through the center of the central effective Fresnel surface 112c. Each of the peripheral teeth SP includes an effective Fresnel surface 112 and a non-effective Fresnel surface 114. Besides, each of the peripheral teeth SP has a tooth peak and a tooth valley of the Fresnel lens 100. The tooth peak is at a position where the peripheral tooth SP with respect to the surface 120 has the maximum thickness, and the tooth valley is at a position where the peripheral tooth SP with respect to the surface 120 has the minimum thickness. On a cross-section including the optical axis I of the Fresnel lens 100, i.e., the cross-section (x-y plane) shown in FIG. 1, a draft angle θ is included between a reference line RL and a connecting straight line L between one end of each non-effective Fresnel surface 114 located at a tooth peak of the Fresnel lens 100 and the other end of the corresponding non-effective Fresnel surface 114 located at a tooth valley of the Fresnel lens 100. The reference line RL is parallel to the optical axis I and passes through an end of the effective Fresnel surface 114 located at the tooth peak. Each of the draft angles θ is smaller than 90 degrees. The draft angles θ include a first draft angle θ1 counted as the first radially outward from the optical axis I, a second draft angle θ2 counted as the second radially outward from the optical axis I, a third draft angle θ3 counted as the third radially outward from the optical axis I, a fourth draft angle θ4 counted as the fourth radially outward from the optical axis I, and a fifth draft angle θ5 counted as the fifth radially outward from the optical axis I.

In the present embodiment, in the first peripheral tooth SP1, the first draft angle θ1 is included between a first reference line RL1 and a first connecting straight line L1 (a first non-effective Fresnel surface 1141), and there is only one first effective Fresnel surface 1121 between the first non-effective Fresnel surface 1141 and a second non-effective Fresnel surface 1142. In the second peripheral tooth SP2, the second draft angle θ2 is included between a second reference line RL2 and a second connecting straight line L2 (a second non-effective Fresnel surface 1142), and there is only one second effective Fresnel surface 1122 between the second non-effective Fresnel surface 1142 and a third non-effective Fresnel surface 1143. In the third peripheral tooth SP3, the third draft angle θ3 is included between a third reference line RL3 and a third connecting straight line L3 (a third non-effective Fresnel surface 1143), and there is only one third effective Fresnel surface 1123 between the third non-effective Fresnel surface 1143 and a fourth non-effective Fresnel surface 1144. In the fourth peripheral tooth SP4, the fourth draft angle θ4 is included between a fourth reference line RL4 and a fourth connecting straight line L4 (a fourth non-effective Fresnel surface 1144), and there is only one fourth effective Fresnel surface 1124 between the fourth non-effective Fresnel surface 1144 and a fifth non-effective Fresnel surface 1145. In the fifth peripheral tooth SP5, the fifth draft angle θ5 is included between a fifth reference line RL5 and a fifth connecting straight line L5 (a fifth non-effective Fresnel surface 1145). The magnitude relationship of these draft angles θ is described below. The second draft angle θ2 is larger than the first draft angle θ1. The third draft angle θ3 is larger than the second draft angle θ2. The fourth draft angle θ4 is larger than the third draft angle θ3. The fifth draft angle θ5 is larger than the fourth draft angle θ4. In other words, the draft angles θ gradually increase outward from the optical axis I along a radial direction.

Table 1 below shows the maximum amount of illuminance of a Fresnel lens provided in a comparative embodiment and the Fresnel lens provided in the embodiment depicted in FIG. 1, and the maximum amount of illuminance is measured at different views of angle. Table 2 below shows an area of stray light generated by the Fresnel lens provided in the comparative embodiment and the Fresnel lens provided in the embodiment depicted in FIG. 1, and the area of the stray light is measured at different views of angle. Here, in the Fresnel lens provided in the comparative embodiment, the magnitude of each draft angle θ is the same.

TABLE 1

| View of Angle (degree) | 10° | 15° |
| --- | --- | --- |
| The maximum amount of illuminance (unit: lux) of the Fresnel lens provided in the comparative embodiment | 0.00196 | 0.00319 |
| The maximum amount of illuminance (unit: lux) of the Fresnel lens provided in the embodiment depicted in FIG. 1 | 0.00115 | 0.00146 |

TABLE 2

| View of Angle (degree) | 10 | 15 |
| --- | --- | --- |
| The area of stray light (unit: mm$^2$) generated by the Fresnel lens provided in the comparative embodiment | 44 | 36.44 |
| The area of stray light (unit: mm$^2$) generated by the Fresnel lens provided in the embodiment depicted in FIG. 1 | 88 | 56.4 |

Given different views of angles, it can be learned from Table 1 that the maximum amount of illuminance of the Fresnel lens 100 provided in the present embodiment is smaller than the maximum amount of illuminance of the stray light generated by the Fresnel lens provided in the comparative embodiment in all cases. Besides, given different views of angles, it can be learned from Table 2 that the area of the stray light generated by the Fresnel lens 100 provided in the present embodiment is greater than the area of the stray light generated by the Fresnel lens provided in the comparative embodiment in all cases. Hence, compared to the Fresnel lens provided in the comparative embodiment, the Fresnel lens 100 provided in the present embodiment is able to effectively reduce the maximum amount of illuminance of the stray light while the different angles of view are given, and the area where the stray light is distributed may be expanded while the total energy of the stray light stays unchanged, so as to lessen the impact of the stray light on the imaging quality. As such, the Fresnel lens 100 provided in the present embodiment can achieve good optical imaging quality.

Besides, in this embodiment, each of the non-effective Fresnel surfaces 114 is a conical surface, and a sectional line formed by intersecting each of the non-effective Fresnel surfaces 114 with the cross-section including the optical axis I is a straight line. Therefore, the Fresnel Lens 100 provided in the present embodiment is easier to be processed and facilitates measurement and correction of calculations after injection molding. Note that five peripheral teeth S and five corresponding draft angles θ are depicted in FIG. 1 as an example; based on actual requirements, other peripheral teeth may be additionally set outward from the fifth peripheral tooth S5 along the radial direction. The number of the additionally set peripheral teeth may be properly modified according to actual requirements, which should however not be construed as a limitation in the disclosure.

Figure 2:
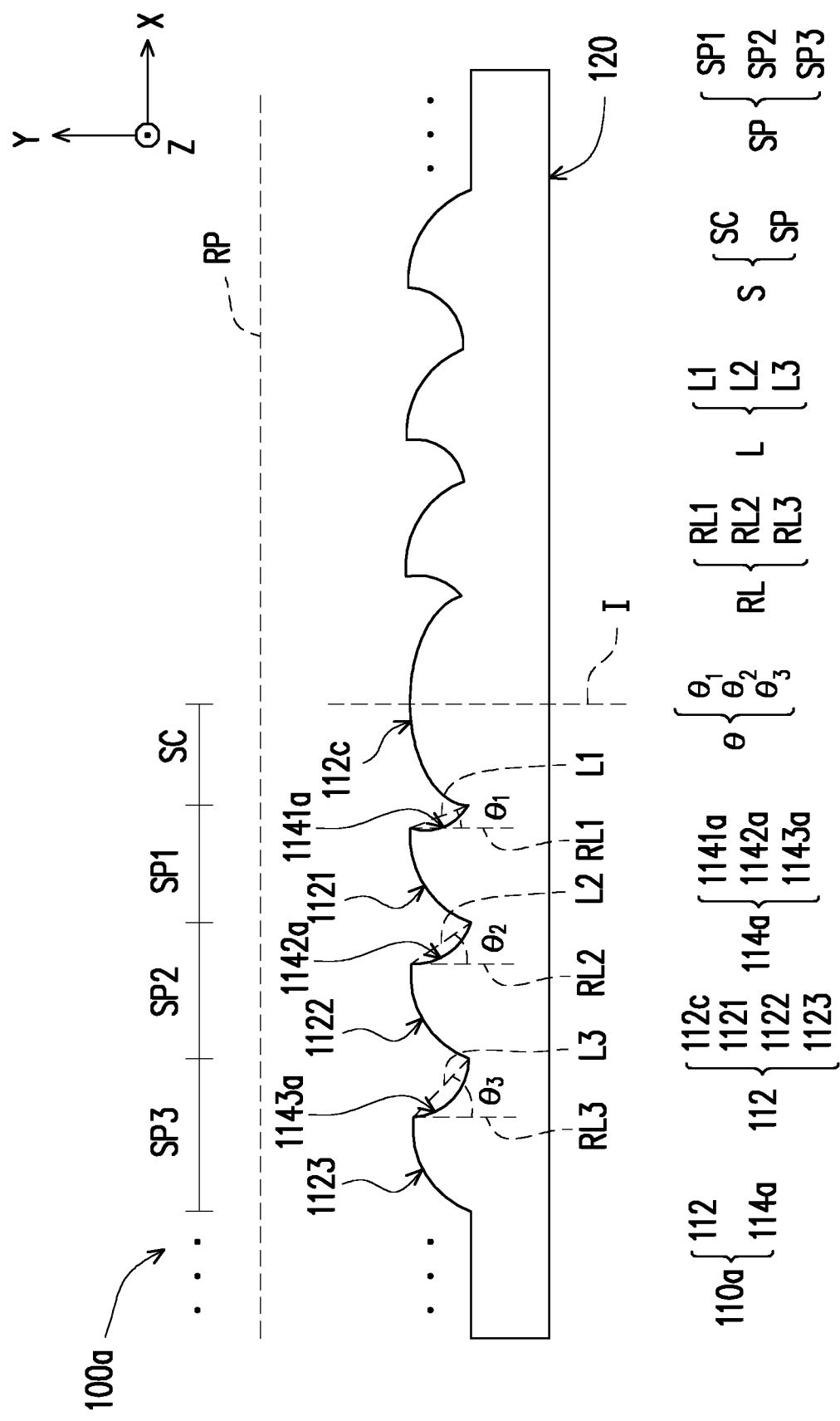

With reference to FIG. 2, the cross-section shown therein includes an optical axis I of the Fresnel lens 100a. The Fresnel lens 100a provided in an embodiment shown in FIG. 2 is substantially similar to the Fresnel lens 100 provided in the embodiment depicted in FIG. 1, while the difference therebetween lies in that the non-effective Fresnel surfaces 114a of the Fresnel surface 110a are surfaces having curvatures in a direction of the cross-section; that is, on the cross-section shown in FIG. 2, the non-effective Fresnel surfaces 114a have curvatures. Said design allows the Fresnel lens 100a to direct the stray light generated by one single peripheral tooth SP to different directions, so as to prevent obvious lens flares or light spots that are generated due to the overly focused stray light. Accordingly, the impact of the stray light on the optical imaging quality may be lessened.

Figure 3:
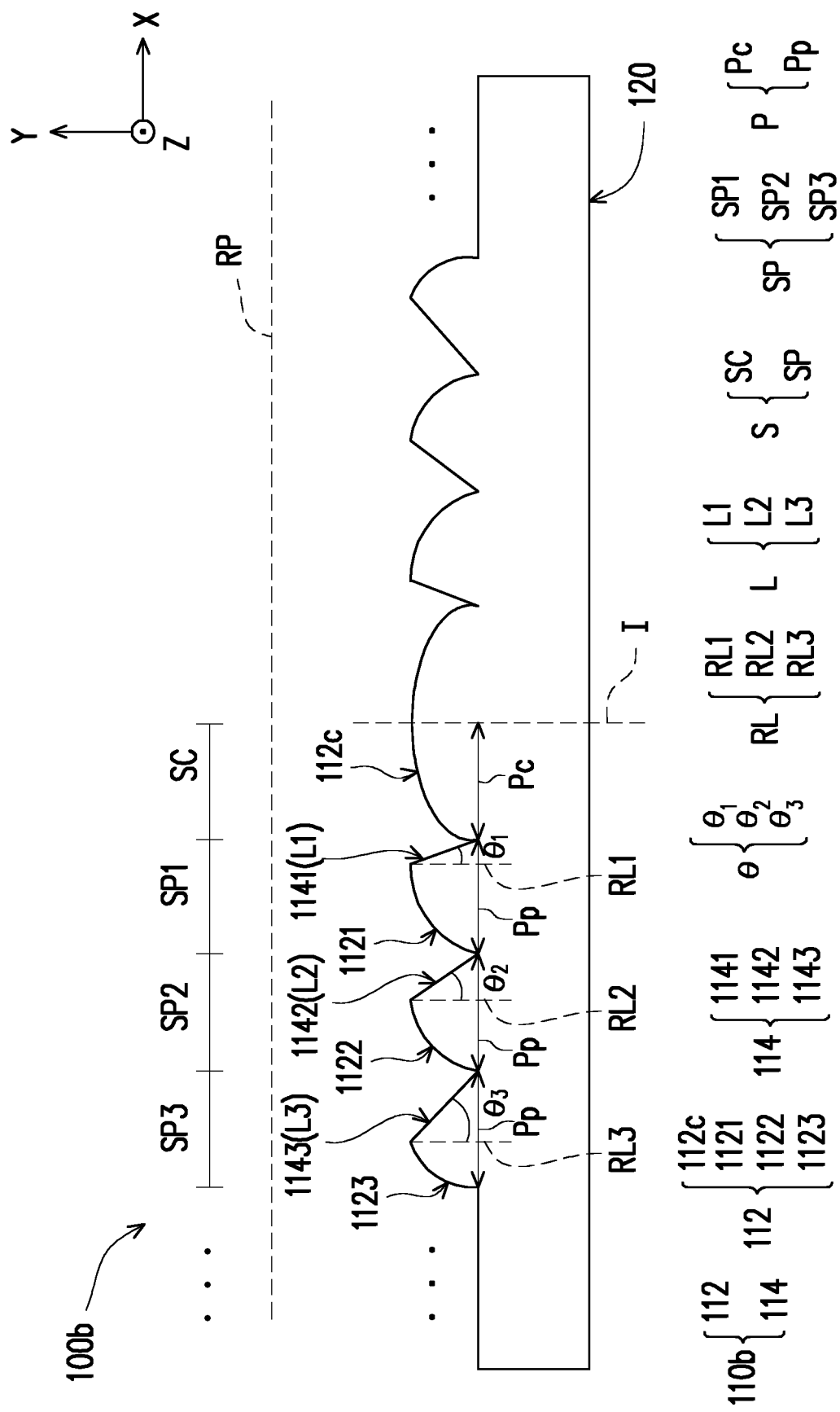

With reference to FIG. 3, the cross-section shown therein includes an optical axis I of the Fresnel lens 100b. The Fresnel lens 100b provided in an embodiment shown in FIG. 3 is substantially similar to the Fresnel lens 100 provided in the embodiment depicted in FIG. 1, while the difference therebetween lies in that the pitch P of each tooth S in the Fresnel lens 100b is the same in a direction perpendicular to the optical axis I, i.e., the direction of the positive x axis, the direction of the negative x axis, the direction of the positive z axis, the direction of the negative z axis, or any other direction parallel to the x-z plane. The pitch Pc of the central tooth SC and the pitch $P_p$ of each peripheral tooth SP are respectively defined below. As to the central tooth SC, the pitch Pc of the central tooth SC in the direction perpendicular to the optical axis I is defined as a distance between the optical axis I and a tooth valley between the central tooth SC and the first peripheral tooth SP1 (i.e., the peripheral tooth SP1 closest to the central tooth SC). As to the peripheral teeth SP, the pitch $P_p$ of each of the peripheral teeth SP in the direction perpendicular to the optical axis I is defined as a distance between a tooth valley of each of the peripheral teeth SP at one side close to the optical axis I and a tooth valley of each of the peripheral teeth SP at the other side away from the optical axis I. The pitch Pc of the central tooth SC is equal to the pitch $P_p$ of each of the peripheral teeth SP, and the pitch $P_p$ of each of the peripheral teeth SP is the same. If it is intended to form a Fresnel lens with the effective Fresnel surfaces 112 having large radius, and the pitch P of each tooth S is to be designed with a certain tooth sag, the resultant pitch P would be large, and the number of teeth in the resultant Fresnel lens cannot be preserved to a certain number. As such, the resultant Fresnel lens cannot be thinned down. If the pitch P of each tooth S is designed to be the same, the number of the teeth may be preserved to a certain number, and the Fresnel lens 100b with small thickness and the effective Fresnel surfaces 112 having large radius may be formed. Besides, said design enables the Fresnel surface 110b to be processed easily. In an embodiment, the pitch P is preferably within the following range: 0.05 mm≤P≤0.60 mm.

Figure 4:
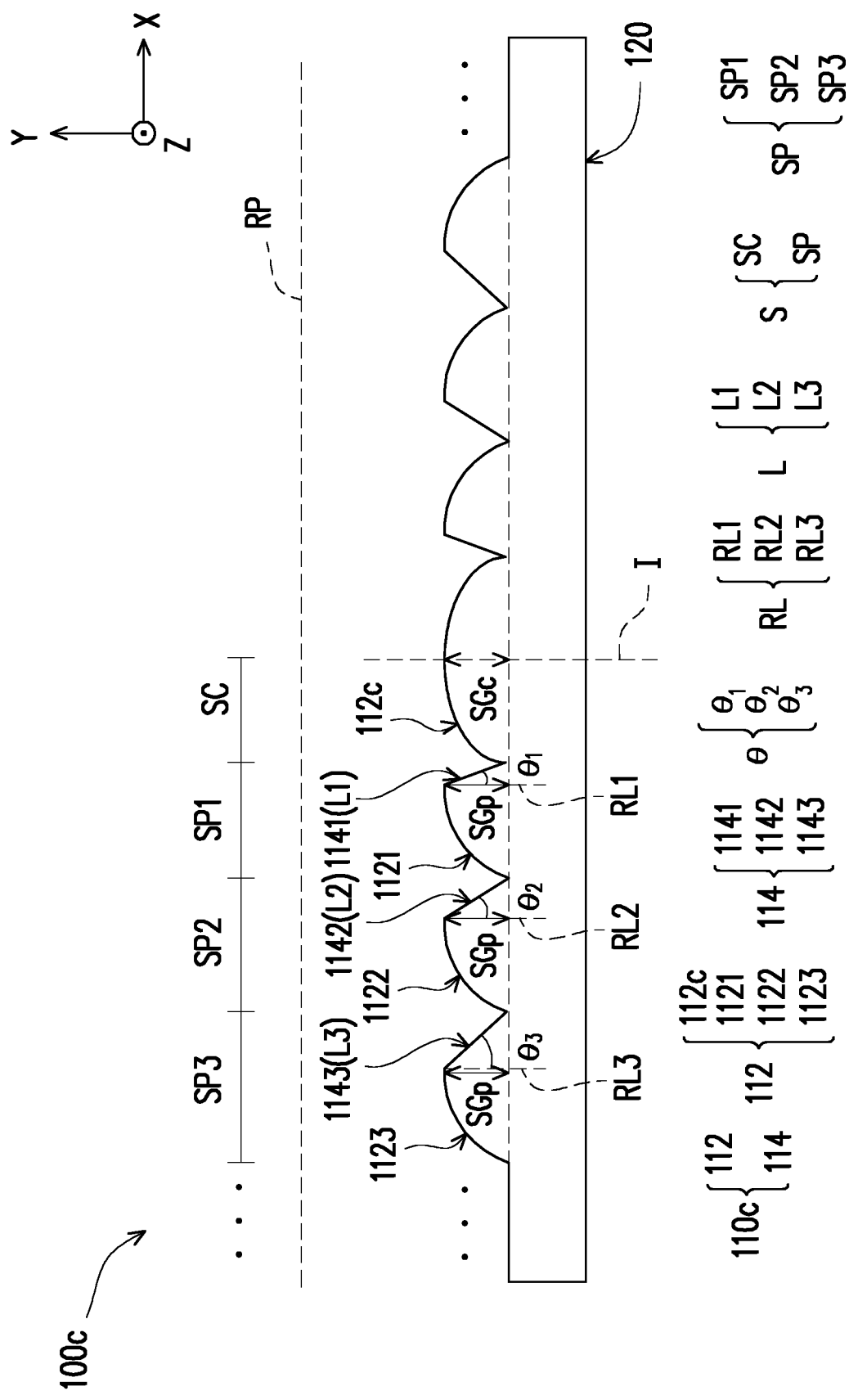

With reference to FIG. 4, the cross-section shown therein includes an optical axis I of the Fresnel lens 100c. The Fresnel lens 100c provided in an embodiment shown in FIG. 4 is substantially similar to the Fresnel lens 100 provided in the embodiment depicted in FIG. 1, while the difference therebetween lies in that the tooth sag SG of each tooth S in the Fresnel lens 100c is the same in a direction parallel to the optical axis I, i.e., the direction of the positive y axis, the direction of the negative y axis, the direction of the positive z axis, the direction of the negative z axis, or any other direction parallel to the y-z plane. The tooth sag SGc of the central tooth SC and the tooth sag $SG_p$ of each peripheral tooth SP are respectively defined below. As to the central tooth SC, the tooth sag SGc of the central tooth SC is defined as a distance between a peak of the central tooth SC at the optical axis I and a tooth valley at an edge of the central tooth SC in the direction parallel to the optical axis I. As to the peripheral teeth SP, the tooth sag $SG_p$ of each of the peripheral teeth SP is defined as a distance between the end of the non-effective Fresnel surface 114 at the tooth peak of each of the peripheral teeth SP on the cross-section including the optical axis I and the other end at the tooth valley of the corresponding peripheral teeth SP in the direction parallel to the optical axis I. The tooth sag $SG_c$ of the central tooth SC is equal to the tooth sag $SG_p$ of each of the peripheral teeth SP, and the tooth sag of each of the peripheral teeth SP is the same. Comparatively, the effective Fresnel surfaces 112 located close to the optical axis I are leveled, and the effective Fresnel surfaces 112 located away from the optical axis I are inclined. Hence, if the pitch of each tooth S may be designed while the tooth sag SG remains unchanged, the Fresnel lens 100c with the first peripheral tooth SP1 farther away from the optical axis I may be designed. As such, the stray light may be avoided from being generated around the imaging center. Besides, said design enables the Fresnel surface 110c to be processed easily. In an embodiment, the tooth sag SG is preferably within the following range: 0.001 mm≤SG≤0.400 mm.

For clear illustration, the fourth peripheral tooth SP4, the fifth peripheral tooth SP5, and the corresponding fourth and fifth draft angles θ4 and θ5 are omitted in FIG. 2 to FIG. 4, and people skilled in the pertinent art may refer to the descriptions provided in the relevant paragraphs and the illustration shown in FIG. 1.

To sum up, the Fresnel lens provided in one or more of the above embodiments may have one or more of the following effects and advantages.

1. The Fresnel lens provided in one or more of the above-mentioned embodiments has the draft angles increasing outward from the optical axis I along the radial direction, such that the imaging light rays incident on the effective Fresnel surfaces 112 are maximized and the imaging light rays incident on the non-effective Fresnel surfaces 114 are minimized, and that the maximum amount of illuminance of the stray light may be reduced. Besides, while the total energy of the stray light stays the same, the area where the stray light is distributed is expanded, so that the overall illuminance of the image may be even, the issue of uneven local illumination may be resolved, and the clarity of the image may be accordingly improved. Additionally, since the central visual field of human eyes is much more sensitive than the peripheral visual field, the clarity at the center of the image is relatively perceivable, and therefore the clarity at the center of the image may be effectively improved by setting the first draft angle θ1 to the fifth draft angle θ5 to gradually increase outward from the optical axis I along the radial direction.

2. If each draft angle θ is larger than or equal to 1 degree and smaller than or equal to 25 degrees, the difficulty in removing the mold during the molding process, which results from the overly small draft angle θ, may be prevented; as such, the lens structure is not damaged. Moreover, effective optical parts may not be significantly lost because the draft angle is not excessively large.

3. In the Fresnel lens provided in one or more of the above-mentioned embodiments, a sixth draft angle counted as the sixth radially outward from the optical axis I, a seventh draft angle counted as the seventh radially outward from the optical axis I, an eighth draft angle counted as the eighth radially outward from the optical axis I, a ninth draft angle counted as the ninth radially outward from the optical axis I, and a tenth draft angle counted as the tenth radially outward from the optical axis I may be additionally set. The sixth draft angle is larger than the fifth draft angle, the seventh draft angle is larger than the sixth draft angle, the eighth draft angle is larger than the seventh draft angle, the ninth draft angle is larger than the eighth draft angle, and the tenth draft angle is larger than the ninth draft angle. Thereby, the maximum amount of illumination of the stray light may be effectively reduced to a greater extent, the issue of uneven local illumination may be better resolved, and the clarity of the image may be accordingly improved.

4. On one side of each of the Fresnel lenses 100, 100a, 100b, and 100c adjacent to the Fresnel surfaces 110, 110a, 110b, and 110c, if a ratio of a sum of lengths of a plurality of orthogonal projections on the reference plane RP perpendicular to the optical axis I of a plurality of section lines of the non-effective Fresnel surfaces 114 on the cross-section including the optical axis I to lengths of a plurality of orthogonal projections on the reference plane RP perpendicular to the optical axis I of a plurality of section lines of the effective Fresnel surfaces 112 on the cross-section including the optical axis I is less than or equal to 0.230, effective optical parts may not be significantly lost, so as to achieve favorable optical imaging quality. In an embodiment, the ratio is preferably less than or equal to 0.230 and greater than or equal to 0.045. The reference plane RP is an x-z plane constituted by the x-axis and the z-axis.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:

1. A Fresnel lens comprising:
   a Fresnel surface comprising a plurality of effective Fresnel surfaces allowing imaging rays to pass through, two adjacent effective Fresnel surfaces of the plurality of effective Fresnel surfaces being connected to each other through a non-effective Fresnel surface;
   on a cross-section including an optical axis of the Fresnel lens, a draft angle being included between a reference line and a connecting straight line between one end of each of the non-effective Fresnel surfaces located at a tooth peak of the Fresnel lens and the other end of the corresponding the non-effective Fresnel surface located at a tooth valley of the Fresnel lens, the optical axis coinciding with the cross-section, each of the draft angles is larger than or equal to 1 degree and smaller than or equal to 25 degrees,
   wherein the draft angles comprise a first draft angle counted as the first radially outward from the optical axis, a second draft angle counted as the second radially outward from the optical axis, a third draft angle counted as the third radially outward from the optical axis, a fourth draft angle counted as the fourth radially outward from the optical axis, and a fifth draft angle counted as the fifth radially outward from the optical axis,
   wherein
   the second draft angle is larger than the first draft angle, the third draft angle is larger than the second draft angle, the fourth draft angle is larger than the third draft angle, and the fifth draft angle is larger than the fourth draft angle,
   on one side of the Fresnel lens, wherein a ratio of a sum of lengths of the plurality of orthogonal projections on a reference plane of the plurality of sectional lines of the non-effective Fresnel surfaces on the cross-section to a sum of lengths of the plurality of orthogonal projections on the reference plane of the plurality of sectional lines of the effective Fresnel surfaces on the cross-section is smaller than or equal to 0.230, wherein the reference plane is perpendicular to the optical axis,.
   wherein a plurality of teeth of the Fresnel surface comprising a central tooth and a plurality of peripheral teeth radially outward from the optical axis, a pitch of each of the plurality of peripheral teeth being equal in a direction perpendicular to the optical axis, wherein the pitch of each of the plurality of peripheral teeth in the direction perpendicular to the optical axis is defined as a distance between a tooth valley of each of the plurality of peripheral teeth at one side close to the optical axis and a tooth valley of the corresponding peripheral teeth at the other side away from the optical axis in the direction perpendicular to the optical axis.

2. The Fresnel lens according to claim 1, wherein the draft angles further comprise a sixth draft angle counted as the sixth radially outward from the optical axis, a seventh draft angle counted as the seventh radially outward from the optical axis, an eighth draft angle counted as the eighth radially outward from the optical axis, a ninth draft angle counted as the ninth radially outward from the optical axis, a tenth draft angle counted as the tenth radially outward from the optical axis, the sixth draft angle is larger than the fifth draft angle, the seventh draft angle is larger than the sixth draft angle, the eighth draft angle is larger than the seventh draft angle, the ninth draft angle is larger than the eighth draft angle, and the tenth draft angle is larger than the ninth draft angle.

3. The Fresnel lens according to claim 1, wherein the non-effective Fresnel surfaces are surfaces having curvatures in a direction of the cross-section.

4. The Fresnel lens according to claim 1, wherein a pitch of the central tooth in the direction perpendicular to the optical axis is equal to the pitch of each of the plurality of peripheral teeth in the direction perpendicular to the optical axis, and the pitch of the central tooth in the direction perpendicular to the optical axis is defined as a distance between the optical axis and a tooth valley between the central tooth and one of the plurality of peripheral teeth closest to the central tooth in the direction perpendicular to the optical axis.

5. The Fresnel lens according to claim 4, satisfying a conditional expression: 0.05 mm≤P≤0.60 mm, wherein P is the pitch of each of the plurality of teeth of the Fresnel surface.

6. The Fresnel lens according to claim 1, a plurality of teeth of the Fresnel surface comprising a central tooth and a plurality of peripheral teeth radially outward from the optical axis, a tooth sag of each of the plurality of peripheral teeth being equal in a direction parallel to the optical axis, wherein the tooth sag of each of the plurality of peripheral teeth in the direction parallel to the optical axis is defined as a distance between the one end of the non-effective Fresnel surface at the tooth peak of each of the plurality of peripheral teeth on the cross-section including the optical axis and the end at a tooth valley of the corresponding peripheral teeth in the direction parallel to the optical axis.

7. The Fresnel lens according to claim 6, wherein a tooth sag of the central tooth in the direction parallel to the optical axis is equal to the tooth sag of each of the plurality of peripheral teeth in the direction parallel to the optical axis, and the tooth sag of the central tooth in the direction parallel to the optical axis is defined as a distance between a peak of the central tooth at the optical axis and a tooth valley at an edge of the central tooth in the direction parallel to the optical axis.

8. The Fresnel lens according to claim 7, satisfying a conditional expression: 0.001 mm≤S≤0.400 mm, wherein S is the tooth sag of each of the plurality of teeth of the Fresnel surface.

* * * * *